Patented Jan. 29, 1952

2,583,638

UNITED STATES PATENT OFFICE 2,583,638

VINYL PHENOL COPOLYMERS

Edward Michael Evans, Tonbridge, England, and John Edward Seager Whitney, Penarth, Wales, assignors to British Resin Products Limited, London, England, a British company No Drawing. Application February 7, 1950, Serial No. 142,949. In Great Britain February 15, 1949

9 Claims. (Cl. 260—47)

The present invention relates to the polymerisation of vinyl phenol-type compounds and has as object the production of copolymers thereof with cyclopentadiene and indene-type substances.

The polymerisation of vinyl phenols is known and the polymerisation of cyclo-pentadiene- and indene-type substances is also known, but the copolymerisation of mixtures of these two types of monomer has not previously been described.

We have now found that, by subjecting mixtures of vinyl phenol-type compounds and cyclopentadiene and/or indene-type compounds to polymerisation conditions copolymers are formed, the molecules of which contain units of each type.

Amongst the polymerisation initiators found to be suitable are strong mineral acids, such as hydrochloric and sulphuric acids, acid activated clays, stannic chloride, boron trifluoride and phosphorus oxy chloride and heat. Polymerisation catalysts of the weaker type, such as organic peroxy compounds, aluminium chloride and ultra violet light may also be used, but are less effective.

By "vinyl phenol-type compound" is meant the ortho-, meta- and para vinyl phenols and their lower nuclear homologues, such as the methyl, ethyl and propyl substituted derivatives, which may be formed by dehydrogenation and/or cracking of phenol substituted open chain hydrocarbons. By "cyclopentadiene and/or indene-type compound" is meant cyclopentadiene, indene and coumarone and their polymerisable lower homologues, such as polymerisable methyl and ethyl substituted derivatives, and the process of the present invention extends also to the treatment of materials such as naphtha fractions which contain substantial proportions of these compounds.

The following examples illustrate two embodiments of this invention, the parts referred to being by weight.

Example 1

To 50 parts of monomeric cyclopentadiene, prepared by distillation of the dimer, were added 50 parts of meta vinyl phenol and, after thorough mixing, 2.5 parts of stannic chloride were added at such a rate that the temperature of the reacting mass did not rise above 100° C. When the preliminary exothermic reaction had ceased, the mass was heated for 8 hours at 100° to form a reddish-brown thermoplastic resin. On heating this resin with 12% hexamethylene tetramine at 120° C. it rapidly became insoluble and infusible.

Example 2

A mixture of 100 parts of a naphtha fraction containing 45 parts of unsaturated material, predominantly indene and coumarone, 11 parts of metavinyl phenol and 1 part of activated fuller's earth (No. 249 as supplied by The Fuller's Earth Union Ltd.) was refluxed at atmospheric pressure with stirring for 50 hours. At the conclusion of this period the unpolymerised material was removed by steam distillation at reduced pressure to leave a brown thermoplast which could be rendered infusible and insoluble by heating with 5% of hexamethylene tetramine at 130° C.

The novel resins of this invention may be used as a basis for lacquers or moulding powders and may, if desired, be subjected to the cross linking and/or etherification treatments disclosed in our copending applications, Serial No. 127,783, filed November 16, 1949, and Serial No. 127,784, filed November 16, 1949.

What we claim is:

1. A process as set forth in claim 8, wherein the polymerisation initiator employed is selected from the group consisting of strong mineral acids, acid-activated clays, stannic chloride, boron trifluoride and phosphorus oxychloride.

2. A process as set forth in claim 1, wherein the polymerisation is assisted by heat.

3. A process as set forth in claim 8, wherein the vinyl phenol compound is meta-vinyl phenol.

4. A process as set forth in claim 8, wherein said substance is cyclopentadiene.

5. A process as set forth in claim 8, wherein said substance constitutes part of a naphtha fraction.

6. A metavinyl phenol-cyclopentadiene copolymer.

7. A metavinyl phenol-coumarone indene copolymer.

8. A process for the production of a synthetic resin which comprises copolymerising a vinyl phenol compound, by subjecting it to the action of a polymerization initiator, said compound being selected from the group consisting of ortho, meta and paravinyl phenol and their lower nuclear homologues having at least one unsubstituted reactive hydrogen atom attached to the nucleus with a substance selected from the group consisting of cyclopentadiene, indene, coumarone and their polymerisable lower homologues.

9. A copolymer of a vinyl phenol compound selected from the group consisting of ortho, meta and para vinyl phenol and their lower nuclear homologues having at least one unsubstituted reactive hydrogen atom attached to the nucleus, with a substance selected from the group consisting of cyclopentadiene, indene, coumarone and their polymerisable lower homologues.

EDWARD MICHAEL EVANS.
JOHN EDWARD SEAGER WHITNEY.

REFERENCES CITED

The following references are of record in the file of this patent:

UNITED STATES PATENTS

| Number | Name | Date |
|---|---|---|
| 1,754,052 | Rosenthal | Apr. 8, 1930 |
| 2,499,365 | De Groote | Mar. 7, 1950 |